Figure 1:
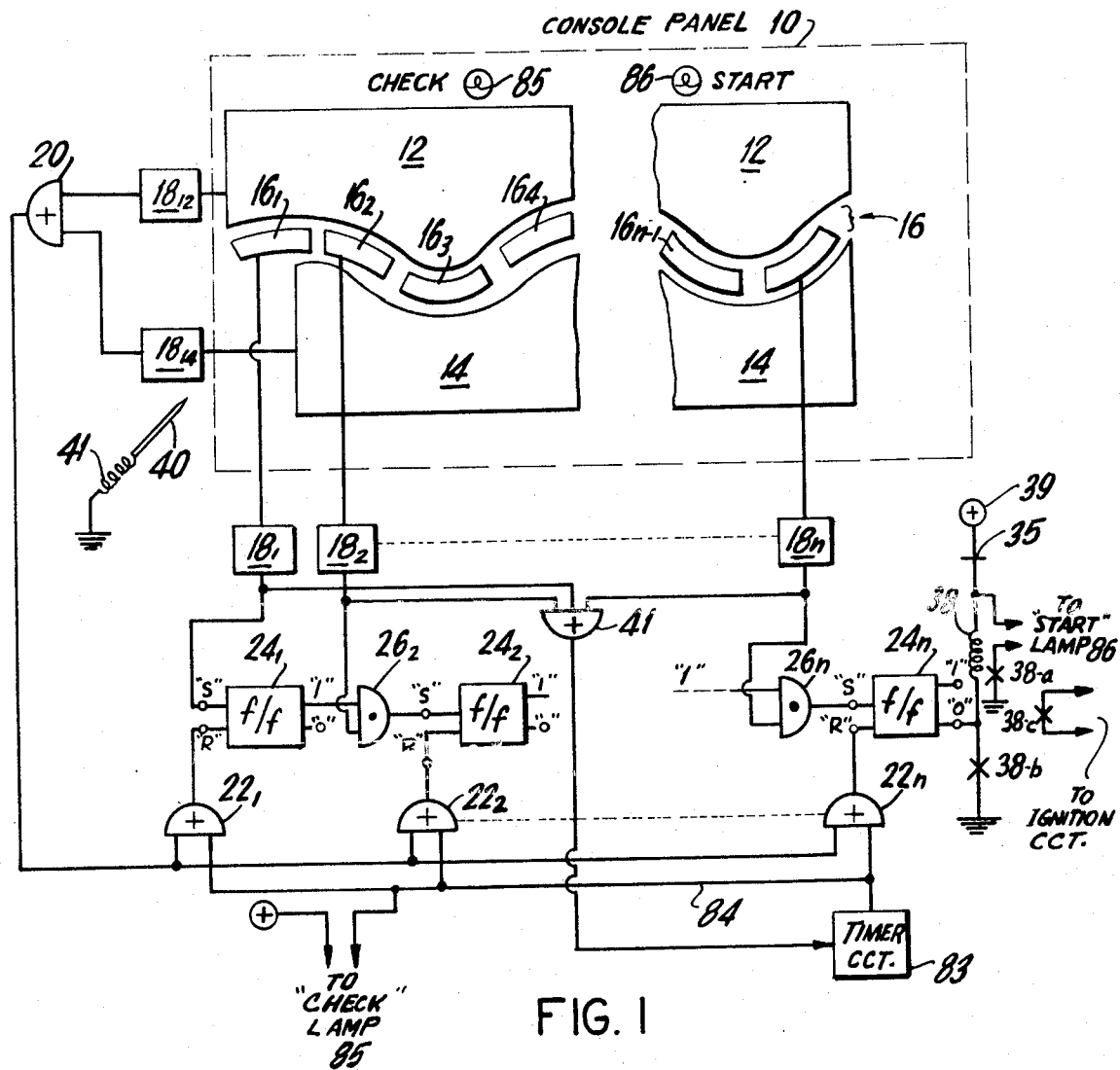

United States Patent [19]

Zadig

[11] 3,735,381
[45] May 22, 1973

[54] TESTING APPARATUS FOR SELECTIVELY ENABLING CONTROLLED EQUIPMENT

[76] Inventor: Ernest A. Zadig, Box 425, South Norwalk, Conn. 06856

[22] Filed: June 1, 1971

[21] Appl. No.: 148,383

[52] U.S. Cl. ................................. 340/279, 180/99
[51] Int. Cl. ............................................. B60k 27/08
[58] Field of Search ............... 340/279, 274, 276, 340/64; 180/99, 114; 317/134; 307/10 R, 10 AT

[56] References Cited

UNITED STATES PATENTS

| | | | |
|---|---|---|---|
| 3,320,490 | 5/1967 | Beck et al. | 317/134 |
| 3,610,943 | 10/1971 | Jones | 180/99 X |
| 3,656,114 | 4/1972 | Hesselgren | 340/274 X |
| 3,524,989 | 8/1970 | Pecott | 180/114 X |
| 3,544,804 | 12/1970 | Gaumer et al. | 317/134 X |
| 3,311,187 | 3/1967 | Haggard, Jr. | 340/279 UX |

Primary Examiner—John W. Caldwell
Assistant Examiner—Scott F. Partridge
Attorney—Sandoe, Hopgood & Calimafde

[57] ABSTRACT

Electronic apparatus requires that the operator of a motor vehicle accurately trace the full course of a segmented undulating serpentine path as a condition precedent to starting a motor vehicle. The path segments must be engaged in seriatum to enable the automobile ignition circuit via intermediate cascaded bistable electronic circuitry.

3 Claims, 3 Drawing Figures

PATENTED MAY 22 1973  3,735,381

INVENTOR.
ERNEST A. ZADIG
BY
Sandoe, Hopgood & Calimafde
ATTORNEYS

TESTING APPARATUS FOR SELECTIVELY ENABLING CONTROLLED EQUIPMENT

This invention relates to safety apparatus and, more specifically, to solid state electronic apparatus for preventing a person under the influence of alcohol, drugs or another disabling infirmity from starting potentially dangerous equipment such as an automobile.

One major and apparently increasing cause of automobile injury and fatality is the partially disabled operator. Effective supervision over the physical and mental state of motor vehicle operators by police or other authoritarian intervention has proven impractical.

It is therefore an object of the present invention to provide operator faculty testing apparatus which may be simply and readily constructed, and which operates in a reliable manner.

The above and other objects of the present invention are realized in specific, illustrative faculty testing, safety apparatus which includes plural test switch apparatus each having one contact thereof arranged to form a segmented irregular, serpentine path. "Error" switch contact surfaces are disposed in proximate relation to the serpentine path.

A motor vehicle operator is required to engage the test contact segments in seriatum, each such engaged contact enabling an associating bistable circuit to thereby also condition a following bistable circuit for switching. When the final bistable circuit has been set, the vehicle ignition circuit is completed.

Should an "error" contact be inadvertently engaged by the operator failing to accurately trace the irregular path, all bistable circuits are reset. Thereafter, the operator must retrace the path from its beginning, or may be prevented from doing so for a desired period of time.

Figure 2:
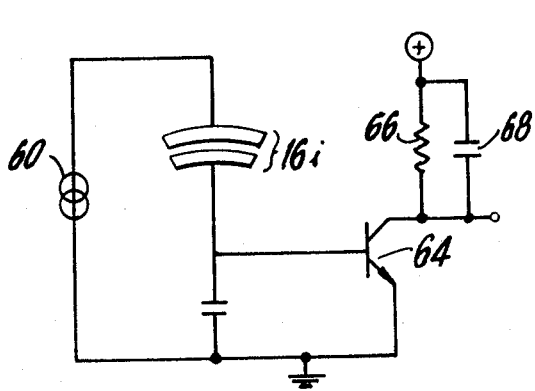
Figure 3:
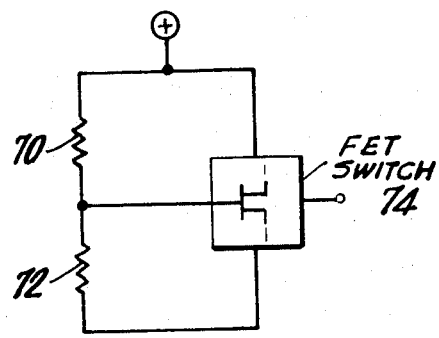

The above and other features and advantages of the present invention will become more clear from a detailed discussion of a specific embodiment thereof, presented hereinbelow in conjunction with the accompanying drawing, in which:

FIG. 1 depicts an illustrative operator sense-testing and equipment start controlling system illustrating the principles of the present invention;

FIG. 2 schematically illustrates switch circuitry for a capacitance-responsive switch configuration; and FIG. 3 schematically depicts switch circuitry for a resistance-responsive switch configuration.

Referring now to the drawing, there is shown solid state electronic apparatus for verifying that the operator of potentially dangerous equipment, such as a motor vehicle, is in possession of his faculties as a condition precedent to enabling the vehicle's ignition system. The vehicle has disposed on some readily accessible surface thereof, e.g., the dashboard complex, a console panel 10 which includes a plurality of segmented conducting surfaces $16_i$ defining a serpentine like path 16. The path may be of any irregular form, e.g., disposed to present a manufacturer's name or logo. Surrounding the irregular path 16 are two conducting sheets 12 and 14, the sheets 12 and 14 being in relatively close proximity to the segmented path 16.

Each of the sheets $16_i$, 12 and 14 comprises one contact member of a switch or switch-like structure. The potential operator of a motor vehicle is required to engage the switch segments $16_1, 16_2 \ldots 16_n$ in order and, having done so, a relay solenoid 38 is then operated to close normally open contacts 38–c for rendering the vehicle ignition system operable. If during the course of his tracing over the path 16, the operator engages either of the contact surfaces 12 or 14, the vehicle ignition circuit will remain disabled by reason of normally open contacts 38–c, and the testing circuitry will revert to a quiescent reset starting condition. Moreover, in accordance with one aspect of my invention, the test path 16 must be successfully traversed in a prealloted period of time.

The contacts $16_i$ may be included in any well known type of switch construction. In the arrangement of FIG. 1, the contact segments are sequentially grounded by a conducting probe 40 and conductor 41, the conducting plate surfaces $16_i$ being of a floating potential when not engaging the ground probe 40. The grounded-ungrounded state of each of the switch surfaces $16_i$ is sensed by an associated switch sensor circuit $18_i$ which, for a grounded-floating switch surface 16, may simply comprise any current sinking logic structure such as a DTL or TTL logic gate input terminal.

With the circuit in its quiescent condition, the normally high output of a timer circuit 83 resets a plurality of bistable flip flop circuits 24 acting through a conductor 83 and a plurality of OR logic gates 22. With the system in this state, each of the flip flops $24_2$–$24_n$ respectively associated with the serpentine path switch contacts $16_2$–$16_n$ are constrained to remain in their reset condition by an AND gate 26 connected to the set input terminal thereof. In particular, the relatively low voltage at the 1 output of the preceding flip flop 24 in the cascaded flip flop chain maintains the output of each of the AND gates $26_2$–$26_n$ in a low voltage output condition.

When the operator begins his sobriety (or other undue debilitating influence) test, he must first contact the switch segment $16_1$ with the grounded probe 40. This provides a set signal to the flip flop $24_1$ via the sense circuit $18_1$ thereby giving rise to a relatively high voltage at the 1 output terminal of the flip flop $24_1$. This, in turn, partially enables the AND gate $26_2$. If the grounded probe contacts any of the other switch segments $16_2$–$16_n$, the output of the corresponding sense circuit $18_i$ is blocked from passing through the associated AND gate $26_i$.

With the flip flop $24_1$ set in the manner described above, the operator continues tracing the probe 40 along the serpentine path 16. when the probe reaches conducting surface $16_2$, the output circuit $18_2$ acts through the now fully switched AND gate $26_2$ to set the flip flop $24_2$. The high output at the 1 terminal of the flip flop $24_2$ thus partially enables the following AND gate $24_3$. As long as the operator correctly engages the segments $16_i$ in their proper order, the flip flops $24_i$ are set in turn in a direction from the input segment $16_1$ (flip flop $24_1$) through the output segment $16_n$ (flip flop $24_n$).

At the beginning of the testing operation when the first segment $16_1$ is touched by the probe 40, the output of the probe $18_1$ passes through an OR gate 41 thus beginning a cycle of operation for the timer circuit 83. The output of the timer 83 switches for a predetermined period of time from a relatively high output which blocks the flip flops 24 to a relatively low unblocking output voltage. The timer circuit 83 may comprise any well known construction therefor such as a one shot multivibrator, or may comprise a rotating electromechanical switch and cam embodiment well known to those skilled in the art. Thus for the alloted period of time when the output of the timer circuit 83 is low, the operator must successfully complete his task of traversing the irregular path 16. Further, the relatively low potential on the line 84 completes a circuit path through a CHECK lamp 85 on the console panel to signal that the unit is in a test mode, and that the operator has a limited time to successfully complete the test. The outputs of each of the other switch sensing circuits 82 will similarly energize the timer circuit 83 through the OR gate 41 to begin the allowable testing interval if the operator inadvertently touches any one of the segments $16_2-16_n$ with the probe 40.

After the operator has proceeded in the above described manner to properly engage each of the contacts $16_1-16_n$ with the probe 40 by tracing the path 16, each of the flip flops $24_1-24_n$ is switched to its set condition. The relatively low output voltage at the 0 output of the set final flip flop $24_n$ then energizes the relay coil 38 from a relay voltage source 39, the relay 38 thereafter being maintained energized by the latching contacts 38–$b$ independent of the state of the flip flop $24_n$. With the relay coil 38 energized, the normally open relay contacts 38–$c$ are closed to complete the ignition circuit. Moreover, normally open contacts 38–$a$ are closed to energize a START lamp 86 on the front console to signal the operator that he has successfully completed the test. The operator may then operate his automobile ignition in standard fashion to start and maintain the vehicle. A normally closed switch 35–$a$ is provided to de-energize the relay and contacts 38 and 38–$a$, $b$ and $c$ after the vehicle has been shut down after use.

The above discussion has assumed that the operator has successfully traversed the path 16 without touching either of the plate surfaces 12 or 14. If in fact the operator fails his test by touching either of these contacts, associated switch sensor circuits $18_{12}$ and $18_{14}$ act through an OR gate 20 and each of the OR gates $22_1-22_n$ to reset each of the flip flops 24. When this occurs, the operator must start from the beginning at the switch segment $16_1$ to completely retrace the path 16. Similarly, if the operator fails to successfully traverse the path 16 before the relatively low voltage output of the timer circuit 83 times out, the following relatively high potential supplied by the circuit 83 acts through the OR gates $22_1-22_n$ to reset all the flip flops thereby preventing ignition. Moreover, this reset condition is maintained for the duration of the normally high potential supplied by the circuit 83. This period may be made substantial such that the operator failing the test is not able to start his vehicle for a considerable period of time during which he may presumably regain his complete faculties or find other modes of transportation.

The arrangement of FIG. 1 employed switch contacts $16_i$ which were responsive to a grounded probe 40. The contact plates $16_i$ and the following sense circuits $18_i$ may comprise other switch structures, such as capacitance responsive switches well known to those skilled in the art. FIG. 2 shows such capacitive switch circuitry wherein an increase in the capacitance of a split segment conducting plate $16_i$ caused by finger wiping pressure increases the AC potential supplied by a source 60 at the base of a transistor 64, periodically turning this device on. Accordingly, a relatively low potential is impressed at the transistor collector via a shunt resistance-capacitance low pass filter network 66–68.

Correspondingly, FIG. 3 shows a resistance responsive network wherein a field effect transistor (FET) switch circuit 74 is responsive to the change of gate potential created when the resistivity of an operator's finger is impressed in parallel with a selected resistor 70 or 72 of a voltage divider network (depending upon whether the operative FET device is a depletion or enhancement mode unit). The resistor 70 or 72 would per se comprise the path 16 which would be formed of a relatively high resistivity material.

The above described arrangements are merely illustrative of the principles of the present invention. Numerous modifications and adaptations thereof will be readily apparent to those skilled in the art without departing from the spirit and scope of the present invention.

What is claimed is:

1. In combination in testing apparatus for selectively enabling controlled equipment, a plurality of spaced switch members having contact surfaces thereof arranged in an irregular path, plural cascaded bistable circuits, means responsive to the output of each of plural of said bistable circuit for selectively partially enabling the next following bistable circuit, means connecting each of said switch members with an input of a different one of said bistable circuits, an activated one of said switch members switching only a partially enabled bistable circuit connected thereto, means responsive to the last of said cascaded bistable circuits attaining a predetermined state for enabling the controlled equipment, and at least one additional switch contact sheet disposed in proximate relation to said irregular path-arranged contact surfaces of said plural spaced switch members, means responsive to any of said additional sheet being activated for resetting said bistable circuits, and means for tracing along said irregular path-arranged contact surfaces to enable the controlled equipment when said contacts are serially engaged by said tracing means without said tracing means engaging said additional switch contact sheet.

2. A combination as in claim 1 further comprising timer means for resetting said bistable means after a predetermined testing interval has elapsed.

3. A combination as in claim 1 further comprising check lamp means, means for illuminating said check lamp means during the course of a testing interval, start lamp means, and means for illuminating said start lamp means upon successful engagement in seriatum of said switch members.

* * * * *